US 8,295,148 B2

(12) United States Patent
An

(10) Patent No.: US 8,295,148 B2
(45) Date of Patent: Oct. 23, 2012

(54) DUAL FORMAT HYBRID STORAGE MEDIUM AND DATA BACKUP METHOD USING THE SAME

(75) Inventor: Jong-tae An, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2826 days.

(21) Appl. No.: 10/847,469

(22) Filed: May 18, 2004

(65) Prior Publication Data
US 2004/0233810 A1    Nov. 25, 2004

(30) Foreign Application Priority Data
May 19, 2003  (KR) .................. 10-2003-0031548

(51) Int. Cl.
*G11B 7/24* (2006.01)

(52) U.S. Cl. .................. 369/275.2; 369/53.17

(58) Field of Classification Search ........... 369/275.2, 369/275.3, 275.1, 53.17, 53.12, 59.25, 30.07, 369/47.14
See application file for complete search history.

(56) References Cited

U.S. PATENT DOCUMENTS
5,111,444 A * 5/1992 Fukushima et al. ....... 369/53.17
5,241,431 A * 8/1993 Warner et al. .................. 360/67

FOREIGN PATENT DOCUMENTS
JP  11096655 A  * 4/1999
JP  2002-208223     7/2002
KR  2002-0042747    6/2002

OTHER PUBLICATIONS
Notice of Office Action issued by the Korean Patent Office on Jul. 21, 2005, 2 pages.

* cited by examiner

*Primary Examiner* — Ali Neyzari
(74) *Attorney, Agent, or Firm* — Staas & Halsey LLP

(57) ABSTRACT

A dual format hybrid storage medium includes a non-recordable section in which data to be reproduced is written and in which data cannot be updated, and a recordable section in which data in the non-recordable section having a high probability of error occurrence may be backed up. The high probability of error is determined based on a range of fluctuation of an RF envelope, an unstable phase locked loop signal, a value of a sum level or sub-beam added level of the reproduced data, an unstable focus lock signal, a range of fluctuation of a track error signal and a range of fluctuation of a focus error signal. A determination is made to test for errors if a freeze-frame is found, audio and video are out of sync, a data seek fails or a picture distortion or a picture mosaic effect occurs.

2 Claims, 5 Drawing Sheets

NON-RECORDABLE SECTION
RECORDABLE SECTION

SECOND LAYER

FIRST LAYER

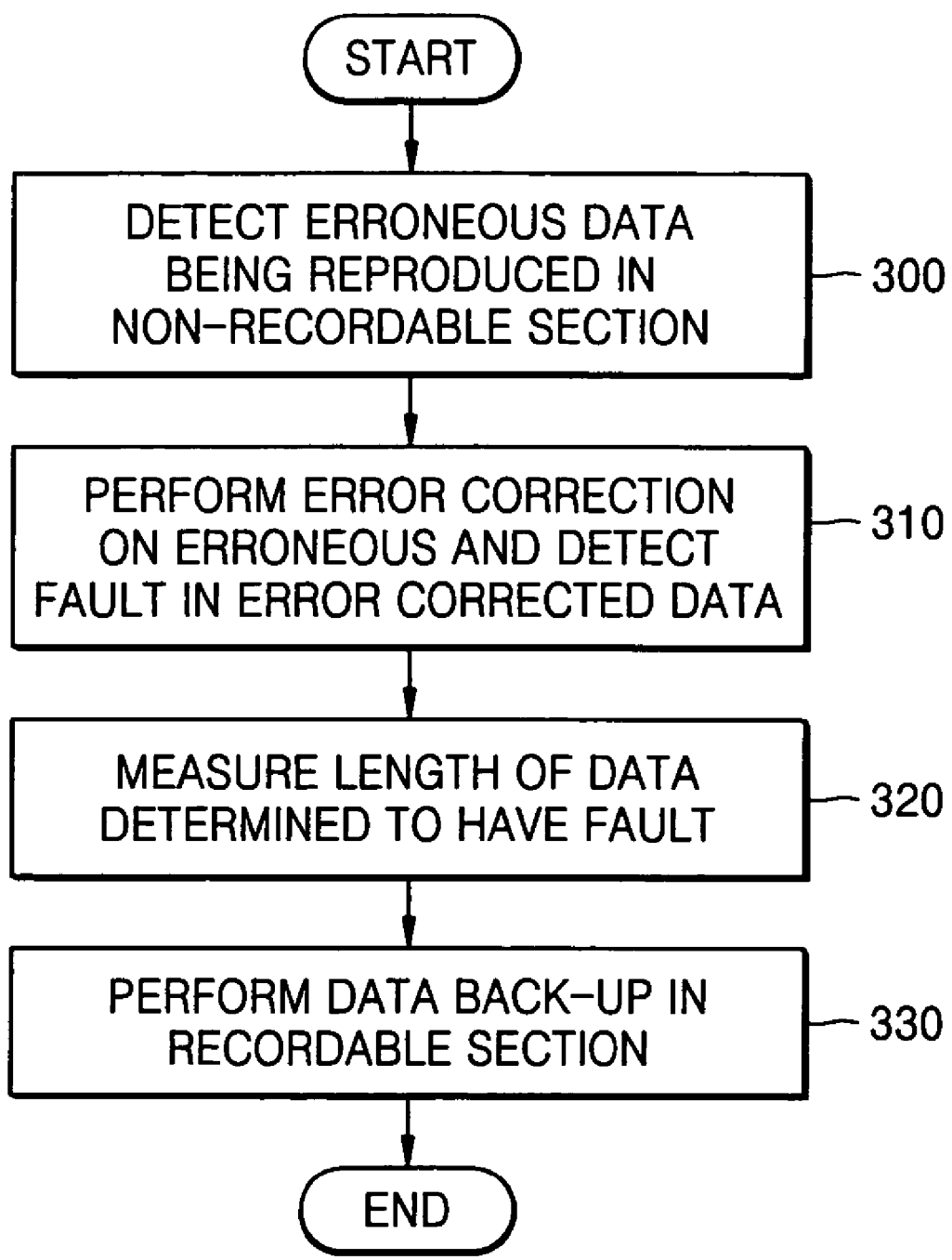

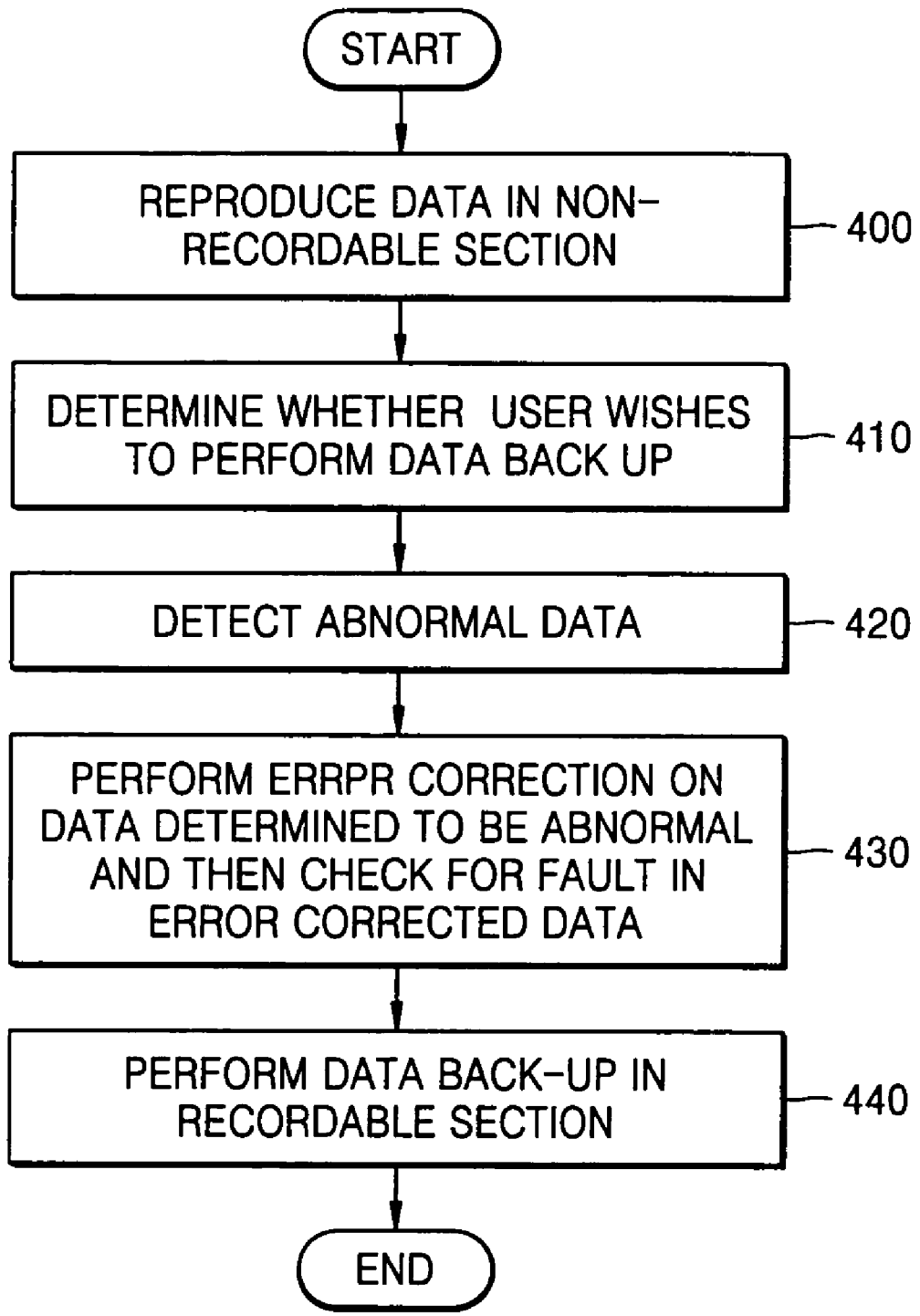

DUAL FORMAT HYBRID STORAGE MEDIUM AND DATA BACKUP METHOD USING THE SAME

CROSS-REFERENCE TO RELATED APPLICATIONS

This application claims the benefit of Korean Patent Application No. 2003-31548, filed on May 19, 2003, in the Korean Intellectual Property Office, the disclosure of which is incorporated herein by reference.

BACKGROUND OF THE INVENTION

1. Field of the Invention

The present invention relates to dual format storage media used for reproduction and recording, and more particularly, to dual format hybrid storage media comprising non-writable and writable sections, in which data in the non-writable section may be backed up into the writable section, and a method of using the dual format hybrid storage media.

2. Description of the Related Art

FIGS. 1A and 1B illustrate discs used as storage media. FIG. 1A shows a disc manufactured using a stamper (non-rewritable) that is used for data reproduction but not for recording. All tracks of the disc shown in FIG. 1A are uniformly structured with pits. FIG. 1B shows a recordable disc that is used for both data recording and reproduction. The recordable disc is structured with wobbled lands/grooves, in which data is outwardly recorded in the lands or grooves on the recordable disc.

With the disc of FIG. 1A, it is impossible to store additional data on the disc to perform data back-up or to store newly generated data. This is disadvantageous in discs such as a disc having instructions for performing a game. Further, with the recordable disc of FIG. 1B, although is possible to back up and store data, important data cannot be protected because it is possible to overwrite the stored data with other data.

Accordingly, there is a need to provide a dual format hybrid storage medium having both a reproduction-only section and a data back-up available section, and a method of storing data on the dual format hybrid storage medium.

SUMMARY OF THE INVENTION

The present invention provides a dual format hybrid storage medium and a method of data backup using the same.

According to an aspect of the present invention, there is provided a dual format hybrid storage medium comprising, a non-recordable section in which data to be reproduced is written and in which data cannot be updated, and a recordable section in which data in the non-recordable section having a high probability of error occurrence may be backed up.

The storage medium may comprise a plurality of tracks, the non-recordable section may be located in inner tracks of the storage medium, and the recordable area may be located in outer tracks of the storage medium.

The non-recordable section may be in a first layer having stamper pit format, and the recordable section may be in a second layer having a land/groove format.

The data to be backed up in the recordable section may be data that is determined to have an RF envelope fluctuation range greater than a predetermined reference range during data reproduction.

The data to be backed up in the recordable section may be data that is determined to have an unstable phase locked loop (PLL) signal during data reproduction.

The data to be backed up in the recordable section may be data that is determined to have a sum level/sub beam add level less than a predetermined reference level during data reproduction.

The data to be backed up in the recordable section may be data that is determined to have an unstable focus lock signal during data reproduction.

The data to be backed up in the recordable section may be data that is determined to have a track error fluctuation range greater than a predetermined reference range during data reproduction.

The data to be backed up in the recordable section may be data that is determined to have a focus error fluctuation range greater than a predetermined reference range during data reproduction.

The data to be backed up in the recordable section may be data that is determined to have an EDC error after performing error correction.

The data to be backed up in the recordable section may be data for which continuous buffering has not been performed during data reproduction.

According to another aspect of the present invention, there is provided a method of data back-up using a dual format hybrid storage medium, comprising, reproducing data in a non-recordable area of the dual format hybrid storage medium, determining whether data is abnormal during reproduction, performing error correction on data determined to be abnormal, and determining whether error corrected data includes a fault during reproduction, and recording data determined to have the fault in a recordable section of the dual format hybrid storage medium.

The determining of whether the data is abnormal during reproduction may comprise checking whether the range of fluctuation of an RF envelope of data being reproduced is greater than a predetermined reference range, and, if so, determining that abnormal data is being reproduced.

The determining of whether the data is abnormal during reproduction may comprise checking whether a phase locked loop (PLL) signal during the data reproduction is unstable, and, if so, determining that abnormal data is being reproduced.

The determining of whether the data is abnormal during reproduction may comprise checking whether a data sum level/sub beam add level is less than a predetermined reference level, and, if so, determining that abnormal data is being reproduced.

The determining of whether the data is abnormal during reproduction may comprise checking whether a focus lock signal is unstable during data reproduction, and, if so, determining that abnormal data is being reproduced.

The determining of whether the data is abnormal during reproduction may comprise checking whether the range of fluctuation of track error during data reproduction is greater than a predetermined reference range, and, if so, determining that abnormal data is being reproduced.

The determining of whether the data is abnormal during reproduction may comprise checking whether the range of fluctuation of focus error during data reproduction is above a predetermined reference range, and, if so, determining that abnormal data is being reproduced.

The determining of whether the error corrected data includes a fault during reproduction may comprise determining that error corrected data has the fault when continuous buffering for error corrected data has not been made.

According to still another aspect of the present invention, there is provided a method of data back-up using a dual format hybrid storage medium, the method comprising, reproducing data in a non-recordable section of the dual format hybrid storage medium, and backing up data in the non-recordable section to a recordable section of the dual format storage medium, wherein data to be backed up in the recordable section is determined to be data having a high probability of error occurrence.

The data to be backed up may be determined by determining whether abnormal data is being reproduced, and, if abnormal data is being reproduced, performing error correction on the abnormal data, and determining whether the error corrected data has a fault, and, if the error corrected data has a fault, recording corresponding data into the recordable section of the dual format storage medium.

The data to be backed up may be determined where a frame freezes during data reproduction.

The data to be backed up may be determined where audio and video are out of phase (sync) during data reproduction.

The data to be backed up may be determined where a data seek fails during data reproduction.

The data to be backed up may be determined where picture distortion occurs or a mosaic effect occurs in a picture during data reproduction.

The determining of whether the abnormal data is being reproduced may comprise checking whether the range of fluctuation of RF envelope of data being reproduced is greater than a predetermined reference range, and, if so, determining that abnormal data is being reproduced.

The determining of whether the abnormal data is being reproduced may comprise checking whether a phase locked loop (PLL) signal during data reproduction is unstable, and, if so, determining that abnormal data is being reproduced.

The determining of whether the abnormal data is being reproduced may comprise checking whether a data sum level/sub beam add level is less than a predetermined reference level, and, if so, determining that abnormal data is being reproduced.

The determining of whether the abnormal data is being reproduced may comprise checking whether a focus lock signal is unstable during data reproduction, and, if so, determining that abnormal data is being reproduced.

The determining of whether the abnormal data is being reproduced may comprise checking whether the range of fluctuation of track error during data reproduction is greater than a predetermined reference range, and, if so, determining that abnormal data is being reproduced.

The determining of whether abnormal data is being reproduced may comprise checking whether the range of fluctuation of focus error during data reproduction is greater than a predetermined reference range, and, if so, determining that abnormal data is being reproduced.

The determining of whether the error corrected data has the fault may comprise determining that error corrected data has the fault when continuous buffering for the error corrected data has not been made.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and/or advantages of the present invention will become more apparent by describing in detail preferred embodiments thereof with reference to the attached drawings in which:

FIG. 3 is a flowchart that illustrates a method of data back-up using the dual format hybrid storage medium, according to the present invention;

FIG. 4 is a flowchart that illustrates another method of data back-up using the dual format hybrid storage medium, according to the present invention.

DETAILED DESCRIPTION OF THE PREFERRED EMBODIMENTS

Figure 1A:
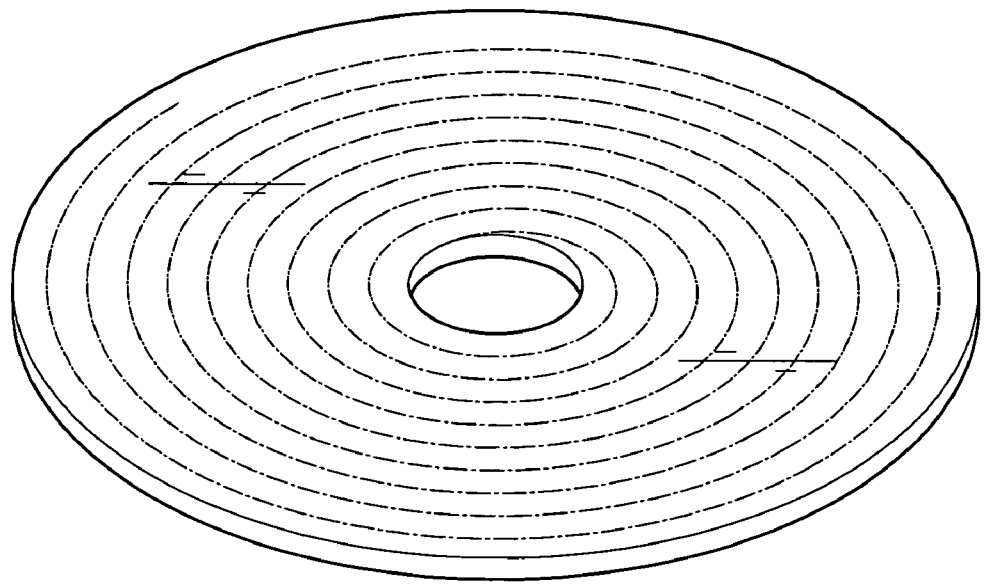
FIGS. 1A and 1B illustrate conventional storage media discs.
Figure 1B:
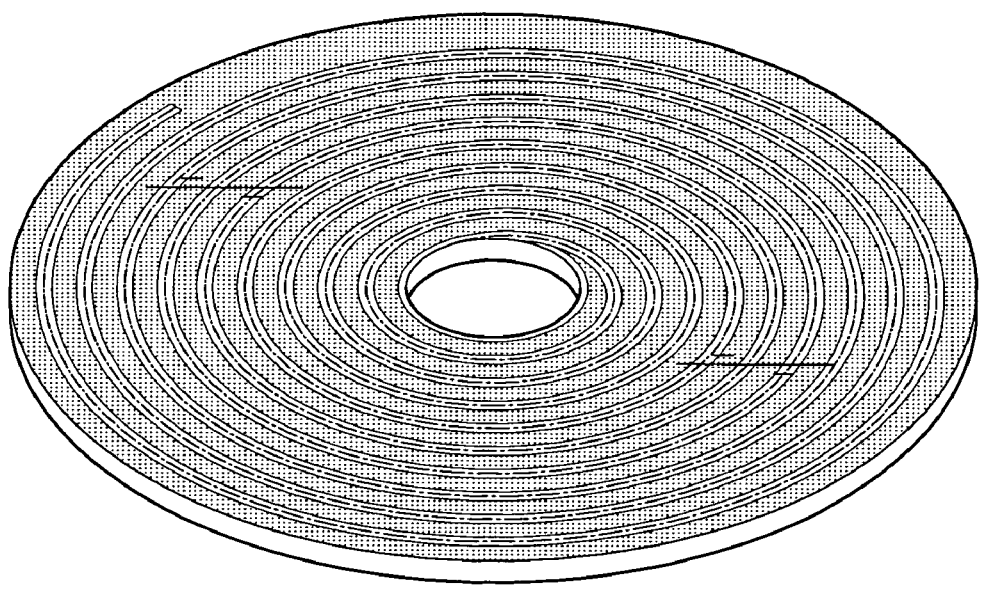

Reference will now be made in detail to embodiments of the present invention, examples of which are illustrated in the accompanying drawings, wherein like reference numerals refer to the like elements throughout. The embodiments are described below to explain the present invention by referring to the figures.

Figure 2A:
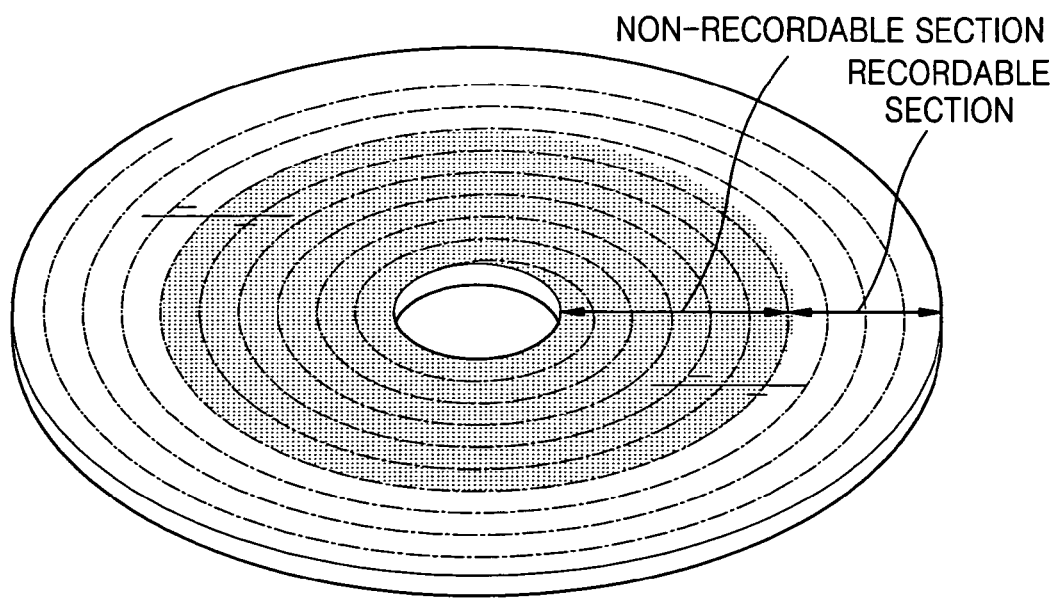
FIGS. 2A and 2B illustrate dual format hybrid discs, according to first and second embodiments of the present invention.
Figure 2B:
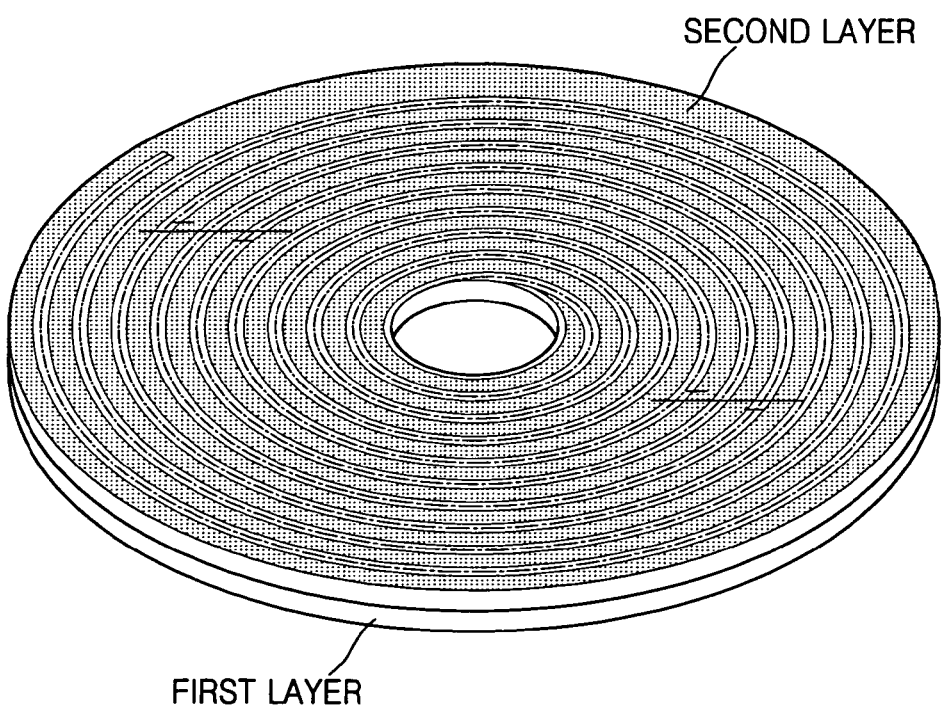

FIGS. 2A and 2B show dual format hybrid storage media (discs) according to embodiments of the present invention.

FIG. 2A shows a first embodiment of the dual format hybrid storage medium, which may be divided into a ROM section (non-recordable section) of inner tracks in a first format that allows only an initial data recording but no further recording thereon, and a recordable section of outer tracks in a second format. The non-recordable section in the first format contains main data to be reproduced. The recordable section in the second format includes back-up data from among data in the non-recordable section, which is considered to have a high probability of error occurrence. Alternatively, the non-recordable section may located in the outer tracks, and the recordable section may located in the inner tracks of the dual format hybrid storage medium.

FIG. 2B shows a second embodiment of the dual format hybrid disc, which comprises a non-recordable first layer of the stamper format and a recordable second layer of the land/groove format, the first layer including data to be reproduced, and the second layer having back-up data from among data in the first layer, which is likely to be contaminated.

The recordable sections of the dual format hybrid discs, such as the outer tracks of FIG. 2A and the second layer of FIG. 2B, may also have secondary data additionally generated during data reproduction, such as data generated during the playing of a game.

The data method of back-up method using the dual format hybrid storage medium according to the present invention will now be described.

FIG. 3 is a flowchart that illustrates the method of data back-up using the dual format hybrid storage medium according to the present invention. The method is performed by an apparatus (not shown) for driving the storage media.

The method begins with detecting whether data being reproduced from the dual format storage medium shows some abnormality in operation 300. The abnormality is determinable by checking at least one of the following conditions:

(1) Whether a range of fluctuation of an RF envelope of data being reproduced is greater than a predetermined reference range, (2) Whether a corresponding phase locked loop (PLL) signal is unstable while current data is being reproduced, (3) Whether a sum level or sub-beam added level of the reproduced data is less than a predetermined reference level, (4) Whether a focus lock signal is unstable while the current data is being reproduced, (5) Whether a range of fluctuation of track error is greater than a second predetermined reference range while the current data is being reproduced, and (6) Whether a range of fluctuation of focus error is greater than a third predetermined reference range while the current data is being reproduced.

If data being reproduced corresponds to one of the above six conditions (1) through (6), the data being reproduced is determined to be abnormal data, that is to have an error or at least a high probability of an error. A high probability of error means that a probability that an error exists exceeds a predetermined value.

After detecting the abnormal data, error correction may be performed on data, and then error corrected data is checked again to determine whether it leads to a fault during reproduction, in operation 310. That is, in operation 310, if a result of checking error detection code (EDC) of corresponding data is wrong, or if continuous buffering for error corrected data fails, the error corrected data is finally determined to be data having a high probability of error occurrence.

In operation 320, the length of the data having a high probability of error occurrence is measured so as to secure an area for backing it up in the recordable section of the dual format hybrid storage medium.

In operation 330, data back up is performed by recording data having a high probability of error occurrence in the recordable section of the dual format hybrid storage medium. At this time, information about a position of data to be backed up in the non-recordable area and a corresponding position for data to be backed up on the recordable area may be recorded in the recordable area. Then, when data having a high probability of error occurrence is unable to be read and reproduced from the non-recordable area, corresponding back-up data may be rapidly read and reproduced from the recordable area using the position information.

The method of FIG. 3 may be implemented in an apparatus for reproducing the storage media to be automatically performed.

FIG. 4 is a flowchart that illustrates a second embodiment of a method of data back—using the dual format hybrid storage medium according to the present invention.

First, data in the non-recordable section of the dual format hybrid storage medium is reproduced in operation 400.

The user may determine whether to back up data from among data written in the non-recordable section to the recordable section by checking for predetermined conditions during the data reproduction, such as the following conditions.

(a) whether a freeze-frame is found while data in the non-recordable area is being reproduced,
(b) whether audio and video signals are out of sync when a game contained in the non-recordable section of the dual format hybrid storage medium is being reproduced,
(c) whether a data seek fails, and
(d) whether picture distortion occurs or a picture mosaic effect occurs in a picture.

When the result of reproducing data in the non-recordable area of the dual format hybrid storage medium corresponds to one of the above four conditions (a)-(d), the user determines whether to perform a data back-up in operation 410.

After determining whether to perform data back-up, it is determined whether an abnormality appears in the data being reproduced, by checking for a condition such as one of the above conditions (1)-(6) in operation 420.

Error correction is performed on data determined to be abnormal during reproduction, and then another check is performed to determine whether there is a fault in error corrected data in operation 430. The fault in error corrected data is detectable by checking the EDC or checking the buffering state for error corrected data.

If there is a fault in operation 430, corresponding data in the non-recordable area is backed up in the recordable area of the dual format hybrid storage media in operation 440.

A difference between the methods of FIGS. 3 and 4 is that the method of FIG. 4 includes a user interactive operation where the user may determine whether to perform data back-up.

Figure 5:
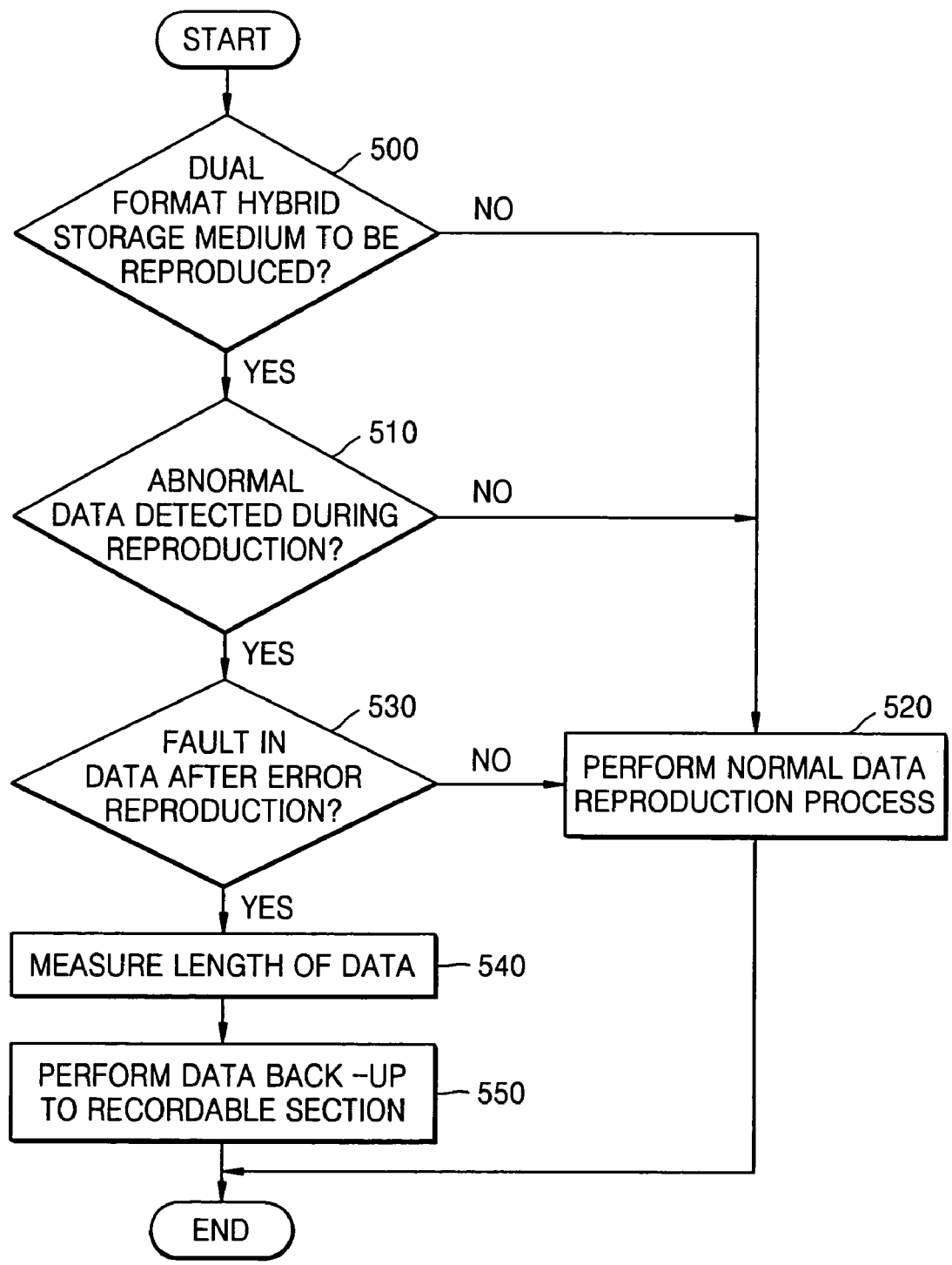
FIG. 5 is a flowchart that illustrates a method of driving the dual format storage media according to the present invention.

FIG. 5 is a flowchart that illustrates a method of driving the dual format hybrid storage medium according to the present invention. The method of FIG. 5 may be implemented in an apparatus for controlling and reproducing the storage media.

The apparatus checks whether a storage medium to be controlled is a dual format hybrid storage medium in operation 500. Where the storage medium to be controlled is a disc, whether the disc has the dual format is determined by checking data in a user area while the apparatus performs initial lead-in.

While reproducing data in the non-recordable area, it is determined whether the data is abnormal, by checking one of the conditions (1)-(6), identified above, in operation 510.

If the data being reproduced is not abnormal, the apparatus performs a normal reproduction process for data in operation 520. Otherwise, the apparatus performs error correction on data and checks whether there is a fault in error corrected data in operation 530. Faults in error corrected data may be detected by checking the EDC or the continuous buffering state for error corrected data.

In operation 540, the apparatus measures a length of data found to have the fault.

Since the dual format hybrid storage medium is now being reproduced, reading data having a high probability of error and backing up the data into the recordable section of the dual format hybrid storage medium should be performed at a safe speed in operation 550.

As described above, according to the dual format hybrid storage medium and back-up method using the same, data written in the non-recordable section, which has a high probability of error occurrence may be backed up in the recordable section after errors have been removed from said data. As such, problems that reproduction speed declines when data having an error in the non-recordable section is reproduced may be solved, and effort and time used to perform the error correction on the data in the non-recordable section whenever the data is reproduced is relieved.

Although the present invention has been shown and described with reference to preferred embodiments thereof, it will be appreciated by those skilled in the art that various changes may be made to the preferred embodiments without departing from the spirit and scope of the invention, as defined by the appended claims and their equivalents.

What is claimed is:

1. A method of data back-up using a dual format hybrid storage medium, the method comprising:
   reproducing data in a non-recordable section of the dual format hybrid storage medium; and
   backing up data in the non-recordable section to a recordable section of the dual format storage medium,
   wherein the data to be backed up in the recordable section is determined to be data having a high probability of error occurrence, and wherein:
the data to be backed up is determined by determining whether abnormal data is being reproduced, and
if abnormal data is being reproduced,
  performing error correction on the abnormal data,
  determining whether the error corrected data has a fault, and,
  if the error corrected data has a fault, recording corresponding data into the recordable section of the dual format storage medium.

2. The method of claim 1, wherein the determining of whether the abnormal data is being reproduced comprises:
  checking whether a range of fluctuation of an RF envelope of data being reproduced is greater than a predetermined reference range, and, if so, determining that the abnormal data is being reproduced.

* * * * *